3,170,946
PREPARATION OF ARYLCHLOROFORMATES
John R. Kilsheimer, Westfield, N.J., and William H. Hensley, Raleigh, N.C., assignors to Union Carbide Corporation, a corporation of New York
No Drawing. Filed Aug. 17, 1961, Ser. No. 131,985
5 Claims. (Cl. 260—463)

This invention relates to an improvement in the process for the preparation of arylchloroformates by the reaction of an aromatic hydroxyl compound with phosgene.

More particularly, this invention relates to an improved process for the preparation of 1-naphthylchloroformate and phenylchloroformate by the reaction of 1-naphthol or phenol with phosgene in the presence of a catalytic quantity of an amine or its hydrohalide salt.

The preparation of chloroformates, including phenylchloroformate and 1-naphthylchloroformate, by the reaction of phosgene with alcohols is well known in the art. The preparation of aliphatic chloroformates is relatively simple since phosgene and most aliphatic alcohols react even in the absence of a catalyst, to give good yields of the resulting chloroformates. However, such is not the case in the manufacture of arylchloroformates and, particularly, phenylchloroformate and 1-naphthylchloroformate. The hydroxyl group of a phenol or 1-naphthol is too acidic to react directly with phosgene to give the corresponding chloroformates.

In order to overcome the acidic nature of the hydroxyl group of the aryl compounds, the art resorted to the addition of amines to make possible the reaction of phosgene with said aryl hydroxyl-containing compounds. Although various amines were used, the processes of the prior art had two common characteristics. In the first place, the amines employed were present in at least stoichiometric quantities and secondly, relatively low operating temperatures were employed.

While not wishing to be bound by any particular theory of operation, it would appear that the art thought that stoichiometric quantities of an amine were necessary to act as an acid acceptor for the hydrogen chloride which is evolved when phosgene reacts with an aryl hydroxyl-containing compound. Thus, since 1 mol or an aryl compound will evolve 1 mol of hydrogen chloride when reacted with 1 mol of phosgene, it would follow that at least 1 mol of an amine would be needed to take up the hydrogen chloride.

The prior art processes suffered from many inherent disadvantages including the use of large amounts of amine which reduced the economy of said processes and the fact that large quantities of amine hydrochlorides were formed which caused clogging or plugging of the lines and equipment.

Therefore, it is the object of this invention to provide a process for the production of arylchloroformates, in particular, phenylchloroformate and 1-naphthylchloroformate, said process being both economical and capable of producing high yields of the desired chloroformates.

It has now been discovered that the above object can be attained by using catalytic quantities of amines and relatively high temperatures.

As has previously been pointed out, the function of the amine is to act as an acid acceptor for the liberated hydrogen chloride. However, the process of this invention is carried out in a solvent system which allows temperatures which are above the decomposition temperature of the amine hydrochloride which is inherently formed in the reaction. Thus, said amine hydrochloride is decomposed to give fresh amine which can in turn accept more hydrogen chloride. It is to be understood that the hydrogen chloride which is produced by the decomposition of the amine hydrochloride is vented off from the reactor. It should become immediately apparent that since fresh amine is constantly being regenerated, catalytic quantities can be used instead of the stoichiometric quantities of the prior art.

As has heretofore been pointed out, the temperature at which the novel process of this invention is conducted is above the decomposition temperature of the amine hydrochloride which is formed. Thus, temperatures of about 100 to 300° C. are operative in this process. No particular advantage is gained in employing temperatures higher than 300° C.

It is to be pointed out that, although a solvent is necessary in the instant process, the exact nature of the solvent is far from being critical. Any solvent can be employed which is inert and has a boiling point higher than the respective amine hydrochloride. The boiling point of the solvents must be in the range of 95–300° C. Typical solvents include: toluene, xylene, isopropylbenzene, chlorobenzene, nitrobenzene, bromobenzene, ethylbenzene, and related substituted aromatic hydrocarbons; Tetralin, Dowtherm, Decalin, diphenyl ether, diphenyl ethane, di-alpha-methylbenzyl ether, and related solvents; heptane, methylcyclohexane, isooctane, n-butyl ether, dioxane, 2-ethylhexane, 1,3-dimethoxy butane, diethyl Cellosolve, octane, nonane, butyl ethyl Cellosolve, dichloroisopropyl ether, dichloroethyl ether, dibutyl Cellosolve, 4-methoxy-2,6-diisopropyl-1,3-dioxane, dihexyl ether, di-2-ethylhexyl ether, trichloropropane, trichloroethane, etc.

The amount of amine catalyst which can be employed varies from about 0.05 to 0.5 mol percent based on the aryl hydroxyl-containing compound. The preferred concentration is from 0.05 to 0.2 mole. The amount of phosgene employed is far from being critical but at least 1 mol of phosgene per mol of naphthol or phenol should be employed.

The amine catalysts which are operative in the novel process of this invention are any tertiary amine, or its hydrochloride or hydrobromide salt which has an ionization constant at 25° C. no higher than $5 \times 10^{-4}$. It is to be pointed out that only weak tertiary amines are operable in this process. Thus, the greater the basicity of the amine, the lower the yield of chloroformate. The preferred amines are those having an ionization constant of from $1 \times 10^{-8}$ to $9 \times 10^{-12}$ at 25° C.

As examples of catalysts which are operable one can include beta-picoline, triethylamine, N,N-dimethylaniline, methylethyl pyridine, 2-isopropylpyridine,2,4-lutidine, etc.

It is to be understood that the hydrochloride and hydrobromide salts of the above are also operative.

The following examples will illustrate the novel process of this invention.

EXAMPLE 1

*Preparation of 1-naphthylchloroformate*

Naphthol, 288 grams (2 mols), N,N-dimethylaniline 30.25 grams (0.25 mol) and 1000 grams anhydrous Tetralin solvent were mixed in a 2-liter, 4-neck Pyrex glass reactor which was fitted with a mechanical stirrer, thermometer, Dry Ice-acetone reflux condenser, external heating mantle, calibrated phosgene gas feed system with a diffuser located at the bottom of the reactor and a hydrogen chloride-phosgene removal system on the blowoff. This mixture was heated externally to 120° C. and at this point the phosgene feed was started through the diffuser at the rate of 50–60 grams/hr. and the feed was completed over a 10 hour period. The reaction is moderately exothermic and the external heating was regulated accordingly to maintain a reaction temperature of 120–125° C. After ten hours' operation under the above conditions, the reaction was shut down and cooled to room temperature. The reaction product was washed at room temperature with 500 cc. of 2 percent hydrochloric acid to remove the dimethyl aniline. The product was then distilled in a Claisen type still to give 242 grams 1-naphthylchloroformate boiling at 110° C. at 1 mm. and having a specific gravity of 1.269 at 25° C. This represents a yield of 59 percent.

EXAMPLE 2

Naphthol 288 grams (2 mols), N,N-dimethylaniline 12 grams (0.1 mol) and 1000 grams xylene solvent were mixed in a 2-liter, 4-neck, Pyrex glass reactor which was fitted with a mechanical stirrer, thermometer, Dry-Ice-acetone reflux condenser, external heating mantle, calibrated phosgene gas feed system with a diffuser located at the bottom of the reactor and a hydrogen chloride-phosgene removal system on the blowoff. This mixture was heated externally to 125° C. and at this point the phosgene feed was started through the diffuser at the rate of 44 grams/hour. The phosgene was fed at 118 to 125° C. at the above rate over a 5 hour period. The reaction was moderately exothermic and the external heating regulated accordingly to maintain the reaction temperature.

After the above treatment, the reaction was cooled and washed with 300 cc. of water at 15° C. The organic layer was then distilled in a Claisen type still to give 376 grams of 97 percent naphthyl chloroformate boiling at 115° C./2 mm. to 130° C./2 mm. and a specific gravity of 1.270 at 25° C. This represents a yield of 88.5 percent.

The by-product which was collected as residue is mainly bisnaphthyl carbonate.

EXAMPLE 3

The apparatus included a column which was a four foot section of Pyrex tubing, 32 mm. I.D., and packed with 40 inches of 8 mm. I.D. glass Raschig rings. Heat was supplied to the lower half of the scrubber by wrapping an electrical heating tape therearound and connecting its ends to a variable resistance transformer, thus controlling the tapes electrical heat output. A minus 20° C. brine condenser was connected to the uppermost portion of the scrubber and this was attached to an hydrogen chloride disposal system. The purpose of the brine condenser was to trap out and recycle unreacted phosgene while allowing most of the hydrogen chloride made to escape. Also connected to the top of the scrubber was a liquid feed line and a thermometer for reading vapor temperature.

Connected to the lowermost portion of the scrubber was the phosgene gas feed system temperature recorder and an appropriate line for maintaining automatically a constant liquid level in the scrubber. There was also a phosgene recycle line connected from condenser to the bottom of the scrubber.

The run was started by charging 320 cc. xylene solvent to the scrubber and heating to 138° C. Then phosgene from a cylinder was introduced to about 40 grams/hour into the bottom of the scrubber until an amount had dissolved to reduce the boiling point of the liquid in the scrubber to 124° C. and start phosgene returning through the recycle line. At this point the liquid feed, containing 144 grams, 1 mol, 1-naphthyl, 930 cc. xylene solvent and 24 grams, 0.2 mole, N,N-dimethylaniline was starting into the top of the scrubber. This solution was fed by mechanical pump at a rate of 300–330 cc. per hour giving a residence time (reaction time) of about 1.5 hours. The run was completed over a four hour period maintaining the reaction temperature in the range of 119 to 126° C. The crude product was distilled in a Claisen type still to yield; 95.6 percent alpha-naphthyl chloroformate, 2.2 percent naphthyl carbonate and 2.3 percent unreacted naphthol. The naphthyl chloroformate fraction was distilled over a range of 114 to 120° C. at 2 mm. mercury pressure.

The above is a continuous process and two or more scrubbers can be connected in series making a cascade type system.

EXAMPLE 4

This run was made with methyl ethyl pyridine as catalyst, using the same procedure as that described in Example 3. The following results were obtained: 1-naphthyl chloroformate, yield 94.1 percent, purity 98.5 percent, boiling point 113–122/2 mm.; naphthyl carbonate, yield 5.9 percent.

EXAMPLE 5

This run was made with methyl ethyl pyridine hydrochloride as catalyst, using same procedure as that described in Example 3. The following results were obtained: 1-naphthyl chloroformate, yield 95.8 percent, purity 98.3 percent, boiling point 113–122° C. at 2 mm.; naphthyl carbonate yield 4.0 percent and naphthol yield 0.8 percent.

EXAMPLE 6

A mixture of 930 grams of chlorobenzene, 94 grams (1 mol) phenol and 4 grams of methyl ethyl pyridine (catalyst) is charged to the reactor described in Example 1. This mixture is then heated to 125° C. and at this point the phosgene feed is started. The theoretical plus a slight excess of phosgene is fed to the reaction over a period of 1.5 hours at a temperature range of 125–130° C. Phenylchloroformate is recovered in a good yield.

EXAMPLES 7–17

By the procedure of Example 3, eleven other amines listed below in Table I were demonstrated to catalyze the reaction of 1-naphthol and phosgene at elevated temperatures (100–138° C.) to give 1-naphthyl chloroformate in a good yield.

| Ex. No. | Catalyst | Conc. Mol percent (on naphthol) | Temp., ° C. | Yield, percent |
| --- | --- | --- | --- | --- |
| 7 | Beta-picoline | 20 | 107–110 | 51.0 |
| 8 | 2-methyl-5-ethyl pyridine | 10 | 130–138 | 71.5 |
| 9 | N,N-dimethyl-p-toluidine | 10 | 121–122 | 86.4 |
| 10 | Alpha-picoline | 10 | 120–122 | 93.0 |
| 11 | 2,4,6-collidine | 10 | 118–128 | 82.2 |
| 12 | 2-ethylpyridine hydrochloride | 10 | 125–130 | 92.7 |
| 13 | 2,4-lutidine | 10 | 102–120 | 91.6 |
| 14 | 2-isopropylpyridine | 10 | 110–122 | 93.4 |
| 15 | Alpha-picoline hydrochloride | 10 | 120–126 | 92.0 |
| 16 | p-Chloro-N,N-dimethyl-aniline hydrochloride | 20 | 100–123 | 87.1 |
| 17 | Triethylamine hydrochloride | 10 | 112–115 | 67.8 |

What is claimed is:
1. A process for preparing an arylchloroformate which comprises reacting an aryl compound selected from the group consisting of 1-naphthol and phenol with phosgene at a temperature of 100 to 300° C. in contact with from 0.05 to 0.5 mol percent based on said aryl compound of an amine selected from the group consisting of tertiary amines and their hydrochloride and hydrobromide salts, said tertiary amine having an ionization constant no higher than $5 \times 10^{-4}$ at 25° C., organic in the presence of an inert solvent having a boiling point of 95–300° C.

2. The process of claim 1 wherein the tertiary amine has an ionization constant at 25° C. of from $1 \times 10^{-8}$ to $9 \times 10^{-12}$.

3. The process of claim 1 wherein the concentration of said amine is from 0.05 to 0.2 mol.

4. A process for preparing 1-naphthylchloroformate which comprises reacting 1-naphthol with phosgene at 100 to 300° C. in contact with 0.05 to 0.5 mol percent, based on 1-naphthol, of a catalyst selected from the group consisting of dimethylaniline and its hydrochloride in the presence of an inert organic solvent boiling at 95–300° C.

5. The process of claim 4 wherein the solvent is xylene.

References Cited in the file of this patent
UNITED STATES PATENTS 2,648,697  Heilberger _____ Aug. 11, 1953

FOREIGN PATENTS 808,490  Great Britain _____ Feb. 4, 1959

OTHER REFERENCES

Wagner and Zook: "Synthetic Organic Chemistry," pp. 483–4 (1953).

UNITED STATES PATENT OFFICE
CERTIFICATE OF CORRECTION

Patent No. 3,170,946                         February 23, 1965

John R. Kilsheimer et al.

It is hereby certified that error appears in the above numbered patent requiring correction and that the said Letters Patent should read as corrected below.

Column 4, lines 73 and 74, strike out "organic in the presence of an inert solvent" and insert instead -- in the presence of an insert inorganic solvent --.

Signed and sealed this 20th day of July 1965.

(SEAL)
Attest:

ERNEST W. SWIDER
Attesting Officer

EDWARD J. BRENNER
Commissioner of Patents